United States Patent
Nicollet et al.

(10) Patent No.: US 8,923,915 B2
(45) Date of Patent: Dec. 30, 2014

(54) RADIO SUBSYSTEM FOR EMITTING/RECEIVING SOFTWARE DEFINED RADIO WITH OPPORTUNISTIC SECONDARY USE

(71) Applicant: Thales, Neuilly sur Seine (FR)

(72) Inventors: Eric Nicollet, Cergy (FR); Frederic Lafaye, Argenteuil (FR); Alejandro Sanchez, Suresnes (FR); Stephane Pothin, Paris (FR)

(73) Assignee: Thales, Neuilly sur Seine (FR)

( * ) Notice: Subject to any disclaimer, the term of this patent is extended or adjusted under 35 U.S.C. 154(b) by 156 days.

(21) Appl. No.: 13/723,342

(22) Filed: Dec. 21, 2012

(65) Prior Publication Data
US 2013/0288613 A1   Oct. 31, 2013

(30) Foreign Application Priority Data
Dec. 22, 2011   (FR) ..................... 11 04033

(51) Int. Cl.
| | |
|---|---|
| H04M 1/00 | (2006.01) |
| H04B 1/00 | (2006.01) |
| G06F 9/48 | (2006.01) |
| H04B 1/40 | (2006.01) |
| H04B 1/52 | (2006.01) |
| G06F 13/16 | (2006.01) |
| H04W 16/14 | (2009.01) |

(52) U.S. Cl.
CPC .............. *H04B 1/0007* (2013.01); *G06F 13/16* (2013.01); *G06F 9/4881* (2013.01); *G06F 9/4887* (2013.01); *H04B 1/0003* (2013.01); *H04B 1/406* (2013.01); *H04B 1/525* (2013.01); *H04W 16/14* (2013.01)

USPC ......................... 455/550.1; 455/552.1; 455/73

(58) Field of Classification Search
CPC ..... G06F 9/4881; G06F 9/5038; G06F 13/16; G06F 13/1626; G06F 13/1642; H04B 1/0003
USPC ............................ 455/73, 550.1, 552.1, 556.1
See application file for complete search history.

(56) References Cited

U.S. PATENT DOCUMENTS

| | | | |
|---|---|---|---|
| 5,784,616 A | | 7/1998 | Horvitz |
| 6,631,440 B2 * | | 10/2003 | Jenne et al. .................. 711/105 |

(Continued)

FOREIGN PATENT DOCUMENTS

| | | |
|---|---|---|
| EP | 2 256 632 A1 | 12/2010 |

OTHER PUBLICATIONS

Noel Bertrand Tchidjo Moyo: "Architecture logicielle et methodologie de conception embarquee sous contraintes temps reel pour la radio logicielle" These Universite Rennes 1, Apr. 20, 2011, XP055045673, pp. 8, 19 and 45 to 52.

(Continued)

*Primary Examiner* — Duc M Nguyen
(74) *Attorney, Agent, or Firm* — Davidson, Davidson & Kappel, LLC

(57) ABSTRACT

Software defined radio equipment is provided. The equipment includes a software defined radio emission/reception radio sub-system, a primary software defined radio application and a secondary software defined radio application capable of interfacing with the radio emission/reception sub-system. The primary software defined radio application is a telecommunications application and the secondary software defined radio application is a cognitive radio application. A software defined radio emission/reception radio sub-system is also provided.

8 Claims, 2 Drawing Sheets

(56) References Cited

U.S. PATENT DOCUMENTS

| | | | |
|---|---|---|---|
| 8,315,645 B2* | 11/2012 | Zhou et al. | 455/454 |
| 8,447,346 B2* | 5/2013 | Cho et al. | 455/550.1 |
| 8,655,283 B2* | 2/2014 | Sun et al. | 455/67.11 |
| 2008/0268892 A1* | 10/2008 | Hamdi et al. | 455/522 |
| 2011/0117871 A1* | 5/2011 | Hu et al. | 455/334 |

OTHER PUBLICATIONS

N. Tchidjo Moyo et al.: "Real-Time Scheduling Analysis for DSP Base Band Processing in Multi-Channel SDR Equipments" Proceedings of the SDR '09 Technical Conference and Product Exposition, Dec. 2009, pp. 1 to 7, XP008158367.

* cited by examiner

RADIO SUBSYSTEM FOR EMITTING/RECEIVING SOFTWARE DEFINED RADIO WITH OPPORTUNISTIC SECONDARY USE

This claims priority to French Application No. 11 04033, filed Dec. 22, 2011 and hereby incorporated by reference herein.

BACKGROUND

The present invention relates to a radio sub-system for emitting/receiving software defined radio with opportunistic secondary use, being part of a piece of radio equipment.

Generally, the invention is located in the field of radio communications. The recent emergence of software defined radio, known under the acronym of SDR for "Software Defined Radio", sees an increasing number of applications in the field of radio communications.

A software defined radio equipment notably includes a radio emission/reception sub-system ensuring emission and/or reception of an electromagnetic signal, commonly called a "SDR Transceiver" according to the terminology. The radio sub-system is capable of operating in the sense of emission on the radio media, of reception from the radio media, or most often of both, either alternately (half duplex) or simultaneously (full duplex).

According to the state of the art, such a radio sub-system is characterized by that it necessarily has a software interface for exchange of messages or control requests and data with the software defined radio application which uses it.

The useful signal exchange between the radio emission/reception sub-system and the software defined radio application is a digital signal, typically digitized in a complex representation in base band.

The radio emission/reception sub-system includes a stage for analog processing operations, interfaced with the radio propagation medium, and a stage a digital processing operations, interfaced with the software defined radio application, separated by a digital/analog and/or analog/digital conversion.

The signal processing chain carrying out the transformation between the signal at the input and the signal at the output can only operate at the given instant for the needs of one and only one software defined radio application. Such a signal processing chain typically includes analog and/or digital filtering operations, of digital decimations and/or interpolations, of frequency transpositions, of Hilbert filtering operations, etc., is distributed between the stage for digital processing operations and the stage for analog processing operations depending on choices specific to each implementation architecture.

In addition to the digital portion of the processing chain, strictly speaking, the digital portion of the software defined radio emission/reception radio sub-system comprises the software means required for the interaction with the software defined radio application using the radio emission/reception sub-system.

The previous discussion summarizes the characteristics of a radio emission/reception sub-system in the typical case when the radio sub-system is only used by a single software defined radio application.

SUMMARY OF THE INVENTION

The invention is included in the case of radio equipment where several software defined radio applications simultaneously use a same radio emission/reception sub-system. For example, when a conventional radio communications application is executed simultaneously with a radio spectrum analysis application for radio sensing, or further in the case of telecommunications simultaneous with electronic scrambling.

Nevertheless, for the reason that the processing chain of the radio emission/reception sub-system can only operate at a given instant for the needs of a single software defined radio application, joint use of a same radio emission/reception sub-system by different software defined radio applications requires specific software interactions between the applications which use the same radio emission/reception sub-system so as to ensure synchronization which avoids any access conflict between software defined radio applications and the radio emission/reception sub-system.

Such modifications in the software packages induce potentially burdensome couplings between software defined radio applications, with the associated impacts in terms of software development and integration, and difficulties in managing the configuration of the resulting software packages when the combinatorics of the potentially coupled applications increase.

The motivation of the invention is to find a remedy to the aforementioned drawbacks, by allowing a joint implementation of several software defined radio applications which access the same radio emission/reception sub-system without the applications depending on each other, avoiding costly software failovers.

For this purpose, an object of the invention is a software defined radio emission/reception radio sub-system being part of a piece of software defined radio equipment, including a radio processing chain, achieving for emission the transformation of a digitized signal stemming from a software defined radio application into an electromagnetic signal capable of being conveyed by radio media and vice versa, for the reception, the transformation of an electromagnetic signal stemming from the radio media into a digitized signal capable of being processed by a software defined radio application, and a software control module capable of driving said radio processing chain while strictly observing primary control requests from a software defined radio application, also called primary software defined radio application.

The software defined radio emission/reception radio sub-system is characterized in that it is capable of processing secondary requests from at least one other software defined radio application, also called secondary software defined radio application, independent of the primary software defined radio application, applying means for:

receiving at least one secondary control request from a secondary software defined radio application, determining at least one primary inactivity period of said radio processing chain corresponding to the non-use of said radio processing chain according to the primary request(s) emitted by the primary software defined radio application, and activating by means of an interface of said radio processing chain so as to satisfy, for a determined primary inactivity period, at least one secondary control request emitted by at least one secondary software defined radio application.

Advantageously, the software defined radio emission/reception radio sub-system may thus be used by software defined radio applications totally independent of each other, without any need for specific programming for ensuring a joint operation of these applications. The secondary software defined radio application uses the radio emission/reception sub-system in an opportunistic way, without perturbing the operation of the primary software defined radio application, for periods of time when the radio sub-system is not used by the primary software defined radio application.

The presence or not of a secondary software defined radio application thus does not by any way have an impact on the programming of the primary software defined radio application, and a secondary software defined radio application may be replaced with another one without any additional programming of the primary software defined radio application. Conversely, from the moment when the secondary software defined radio application is programmed so as to have an opportunistic secondary access, it does not need to be modified regardless of the primary software defined radio application actually used. Only intrinsic compatibility limits between the needs of use of the radio emission/reception sub-system by the primary software defined radio application and those of the secondary software defined radio application will limit the possibilities of proper operation of the secondary software defined radio application.

The radio emission/reception sub-system according to the invention may also have one or more of the features below:
- the software control module is further able to determine, for a given determined primary inactivity period, whether the duration of the primary inactivity period is sufficient for completely satisfying a received secondary control request, and in that the means for activating said radio processing chain are only applied in the case of positive determination;
- a primary control request includes at least one piece of signal information relating to the signal to be emitted or to be received and at least one piece of time information relating to a time instant for beginning emission or reception;
- a secondary control request includes at least one piece of signal information relating to the signal to be emitted or to be received, but does not include any time information relating to a time instant for beginning emission or reception;
- said signal information comprises frequency information of the signal to be emitted or to be received and a piece of information on the number of digital signal samples to be emitted or to be received;
- it includes means for storing in memory a pending secondary control request;
- it includes means for receiving and storing in memory several secondary control requests each stemming from a different secondary software defined radio application, and in that the software control module includes means for selecting secondary control requests to be processed according to a predetermined order.

According to another aspect, the present invention provides software defined radio equipment comprising a software defined radio emission/reception radio sub-system as briefly described above, a primary software defined radio application and a secondary software defined radio application capable of being interfaced with the radio emission/reception sub-system, characterized in that the primary software defined radio application is a telecommunications application and in that the secondary software defined radio application is a radio sensing application.

BRIEF DESCRIPTION OF THE DRAWINGS

Other features and advantages of the invention will become apparent from the description which is given thereof below, as an indication and by no means as a limitation, with reference to the appended figures wherein.

DETAILED DESCRIPTION

The invention deals with the simultaneous implementation of two software defined radio applications, typically a primary radio communications application which is treated with priority, and a secondary application.

The invention finds applications in the civilian field, the primary application being a telecommunications application, for example, according to the GSM standard, and the secondary application being a radio sensing application, which for example consists in analyzing the spectral environment of the radio equipment.

Alternatively, the invention finds applications in the military field, with a primary wave form telecommunications application, and a secondary application of the sensing type cognitive radio or of the electronic warfare type (emission of interferences, decoy or intrusion measurements).

Figure 1:
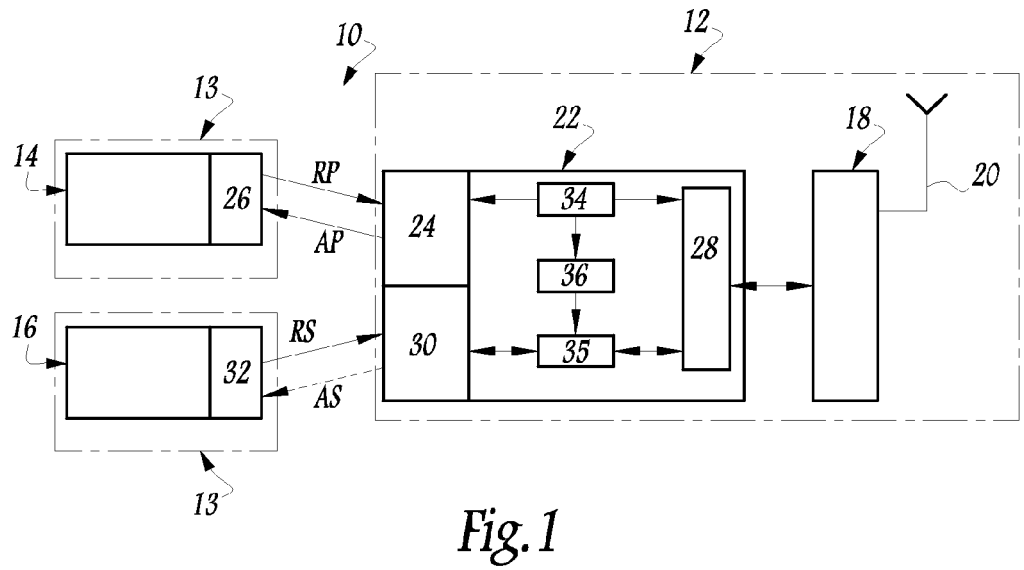
FIG. 1 is a schematic view of the portions of software defined radio equipment applied according to the invention.

The radio equipment 10 according to the invention, illustrated in FIG. 1, comprises a software defined radio emission/reception radio sub-system 12, or "SDR transceiver" according to the terminology, one or more computers 13, applying a primary software defined radio application 14, called hereafter a primary application and a secondary software defined radio application 16, called hereafter a secondary application.

The software defined radio emission/reception radio sub-system 12 includes a signal radio processing chain 18 connected to the radio media 20 via an antenna, the last stage of the processing chain, and a software control module 22, in the form of computer programs implemented by a digital processing processor. The radio processing chain 18 includes, for reception, a portion of analog processing operations and a portion of digital processing operations separated by an analog-digital conversion stage, and, for emission, a portion of digital processing operations and a portion of analog processing operations separated by digital-analog conversion stage. The radio processing chain 18 in emission achieves transformation of a digitized signal stemming from a software defined radio application into an electromagnetic signal able to be conveyed by radio media, and, in reception, the transformation of a received electromagnetic signal via the radio media into a digitized signal capable of being processed by a software defined radio application.

In particular, the software control module 22 comprises a software interface 24 with the programming interface 26 of the primary application 14. Thus the primary application 14 is capable of exchanging primary requests (RP, AP) with the radio sub-system 12, comprising primary control requests and primary data requests. While the primary control requests convey information from the software defined radio application 14 to the radio sub-system 12, the information flows associated with the primary data requests proceed from the software defined radio application 14 to the radio sub-system for emission, and vice versa for reception.

Typically, the primary application 14 sends via the interface 26 primary real time control requests of the type 'RP( )=CreateRxBurst( )' or 'RP( )=CreateTxBurst( )' for requesting reception or transmission of a packet of samples of a radio signal during a burst which extends over a specifically determined period of time and during which the radio sub-system 12 has to perform a specific signal transformation.

The primary control requests provide a piece of signal information comprising any information useful for proper configuration of the signal transformation which the radio processing chain 18 of the radio emission/reception sub-system 12 has to perform, or "a tuning profile". For example the "tuning profile" includes the radio operating frequency, the bandwidth of the signal to be received or to be emitted, or further the sampling frequency of the base band signal exchanged between the software defined radio application 14 and the radio emission/reception sub-system 12.

The primary control requests also ensure control by the software defined radio application 14 of the time characterization of the bursts, by providing the whole of the time information or corresponding "timing profile". More specifically, the question is defining the burst length, typically expressed in the number of digital signal samples or in the duration of the corresponding analog signal, and the instance of time for beginning emission or reception, potentially provided with an accuracy of less than the duration of a base band signal sample exchanged between the software defined radio application 14 and the radio emission/reception sub-system 12.

The software defined radio emission/reception radio sub-system 12 performs with strict compliance time instructions ("timing profile") and signal processing instructions ("tuning profile") as provided by the primary application 14 via the primary control requests. The primary control requests are processed by the control model 34, which relies on an interface 28 for activating the radio processing chain 18 in order to configure it and activate it according to the needs of the primary application.

During the reception of a burst, the radio emission/reception sub-system 12 sends back the series of received samples via one or more primary data requests of the type 'AP=PushRxBBSamples( )'. The data exchange may also be carried out sample by sample, continuously according to the continuous or streaming transmission techniques, known to one skilled in the art.

During the emission of a burst, it is the software defined radio application 14 which sends to the radio emission/reception sub-system 12 the samples to be emitted via one or more primary requests comprising data of the type 'RP=PushTxBBSamples( )'. In the same way as in reception, data exchange may be carried out sample by sample, in a streaming mode.

The whole of the specifications provided above corresponds to the configuration involving a software defined radio application and its software defined radio emission/reception sub-system in the case of software defined radio station executing a single software radio application on the relevant radio channel.

Within the context of the invention, where a secondary opportunistic use of the radio emission/reception sub-system is considered, the interactions between the secondary software defined radio application and the radio sub-system proceed from the mechanism described hereafter, which do not correspond to simple duplication of the primary control interfaces.

The software control module 22 of the radio emission/reception sub-system further comprises interfaces for the primary control and data requests, means or an interface 30 for a software interface with an interface 32 for programming the secondary application 16.

Along the lines of the means discussed earlier, which the primary application has 14, the secondary application 16 has the possibility of exchanging secondary control and data requests with the radio emission/reception sub-system 12. In particular, the secondary application 16 exchanges secondary control requests RS with the portion 30 of the software control module 22 via the interface 32, and receives corresponding answers AS from the interface 30.

The difference between the primary request is that the secondary control requests do not, for any secondary opportunistic access, specify any time information for the beginning of emission/reception only information relating to the desired duration of the bursts, leaving the responsibility to the control module 22 for deciding to activate secondary bursts according to the information on vacancies of use by the primary software defined radio application.

For this purpose, the software control module 22 comprises control means or a controller 34 capable of controlling the radio processing chain 18, via the activation interface 28, according to the primary requests and the means or activator 35 for activating the radio processing chain 18, via the activation interface 28, according to the secondary request, utilizing a means or determiner 36 for determining primary inactivity periods P of the radio processing chain 18 as compared with its use by the primary application implemented by the means or controller 34.

For example, a secondary request, of the type 'RS=requestRxSecondaryBurst( )' in reception or 'RS=requestTxSecondaryBurst( )' in emission, sent via the interface 32 of the secondary application contains information on the nature of the signal processing to be performed ("tuning" information) similar to those which the primary application would have transmitted, information on the desired burst duration, but no information on the intended instant for beginning operation of the radio processing chain 18.

Unlike the primary control requests, which have the value of a control on the radio processing chain 18, the secondary control requests have to be satisfied when the use of the radio processing chain 18 by the primary application 14 leaves vacant ranges allowing means expressed by the secondary software defined radio application 16 to be met.

The secondary data exchange request and answers similar in every respect to the primary data exchange requests and answers are also exchanged between the secondary application 16 and the radio emission/reception sub-system 12.

After determining a sufficient primary inactivity period of the radio emission/reception sub-system for implementing the secondary request, the means or interface 28 for activating the radio processing chain 18 are applied by the means or activator 35 for emitting/receiving a signal according to the secondary requests, thereby generating a secondary burst inserted between the primary bursts.

The time instant for applying the secondary request and the size of the processed packet of samples are notified by the software control module 22 to the secondary application 16 via the interfaces 30 and 32, for example via a message 'notifyRxSecondaryTiming( )' in reception, or 'notifyTxSecondaryTiming( )' in emission. The notification for the time instant for applying the secondary request may be accomplished according to different formats. For example, it may be dated in a time also accessible by the secondary radio application, or relatively to a known event of the secondary software defined radio application.

For a secondary reception request, the received samples are sent to the secondary application via messages of the type 'pushRx2ndBasebandSamples( )', with the possibility of continuously sending them, sample by sample, according to the streaming techniques mentioned above.

Also, in emission, the transmitted samples are sent by the secondary application via messages of the type 'pushTx2ndBasebandSamples( )', with the possibility of sending them continuously, sample by sample, according to streaming techniques.

An example of a primary inactivity interval appears in one of the applications of the invention when mobile transceiver stations regularly transmit a synchronisation pattern, an interval being not used in the time structure of the radio protocol for allowing synchronization operations by taking into account the variations of the propagation time of the signal between two stations. When the receiver is physically close to the transmitter, the reception of the synchronization pattern concludes in the first portion of the allocated synchronization time interval, which leaves available time corresponding to a primary inactivity interval on the remainder of the synchronization interval.

Figure 2:
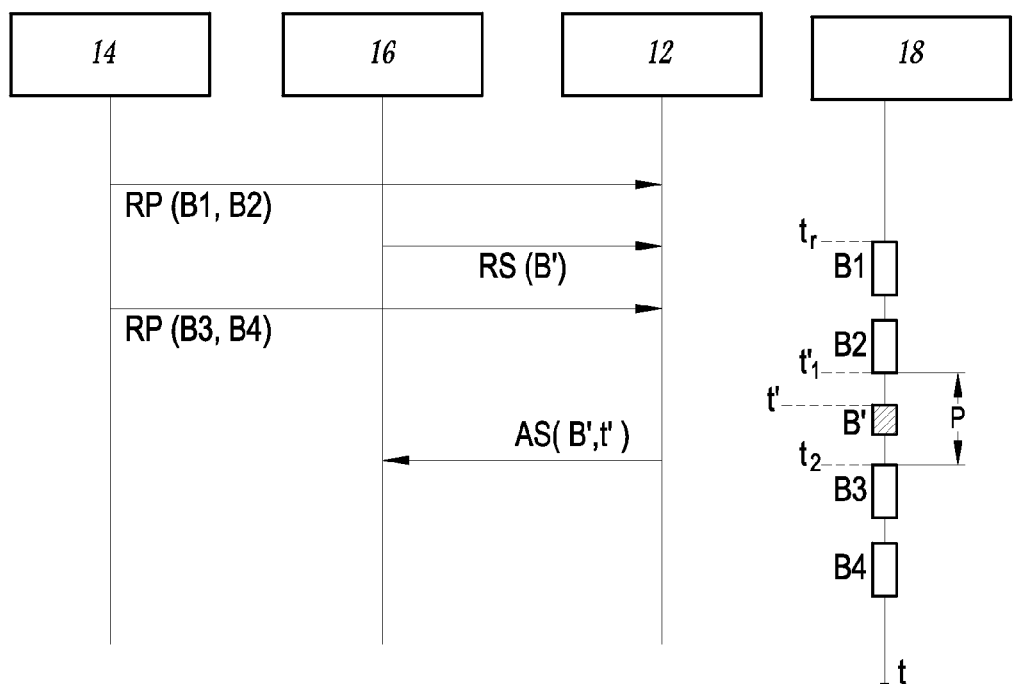
FIG. 2 is an exemplary implementation of exchanges between a primary software defined radio application, a secondary software defined radio application and a radio emissions/reception sub-system according to the invention.

FIG. 2 illustrates an example for simple use of the emission/reception radio according to the invention. FIG. 2 shows in parallel messages (requests and answers) exchanged by the primary and secondary applications and their processing over time by the radio processing chain or radio interface 18.

The primary application 14 sends to the radio emission/reception sub-system 12 or "transceiver" first a primary control request RP(B1,B2), and then a primary data request, concerning the transmission of the packets of samples or bursts B1, B2, each for example including 1024 digital samples of a signal from an instant $t_1$ in time.

A secondary control request RS(B') of the secondary application 16, for example in the case of a secondary cognitive radio application, relating to the reception or acquisition of a packet B' of digital signals of a signal with a given frequency, for example, of 128 samples is then sent to the radio emission/reception sub-system 12 after the instant $t_1$.

Finally, a second primary control request RP(B3,B4), followed by a primary data request, for the transmission of packets of samples or bursts B3, B4, each for example including 1024 digital samples of a signal, from an instant $t_2$ in time, is sent to the radio emission/reception sub-system.

The radio emission/reception sub-system 12 drives the processing chain 18 via the activation interface 28 for answering the primary control requests.

Further, the radio emission/reception sub-system 12, applying the means or determiner 36 for determining a primary inactivity period, determines according instant $t_1$ and to the transmission duration of the packets B1 and B2, that the transmission ends at the time instant $t'_1$. Now, the second primary request begins at the time instant $t_2$, therefore the period P comprised between $t'_1$ and $t_2$ is an inactivity period of the radio processing chain 18 upon considering the primary requests.

The radio emission/reception sub-system 12 drives the processing chain 18 for applying the secondary requests RS(B') for the primary inactivity period P, after having checked that the duration of the primary inactivity period is sufficient for acquiring a packet B' of 128 samples. The acquired packet of samples B', as well as the time instant for reception t', are transmitted as an answer AS(B', t') to the secondary application 16.

Figure 3:
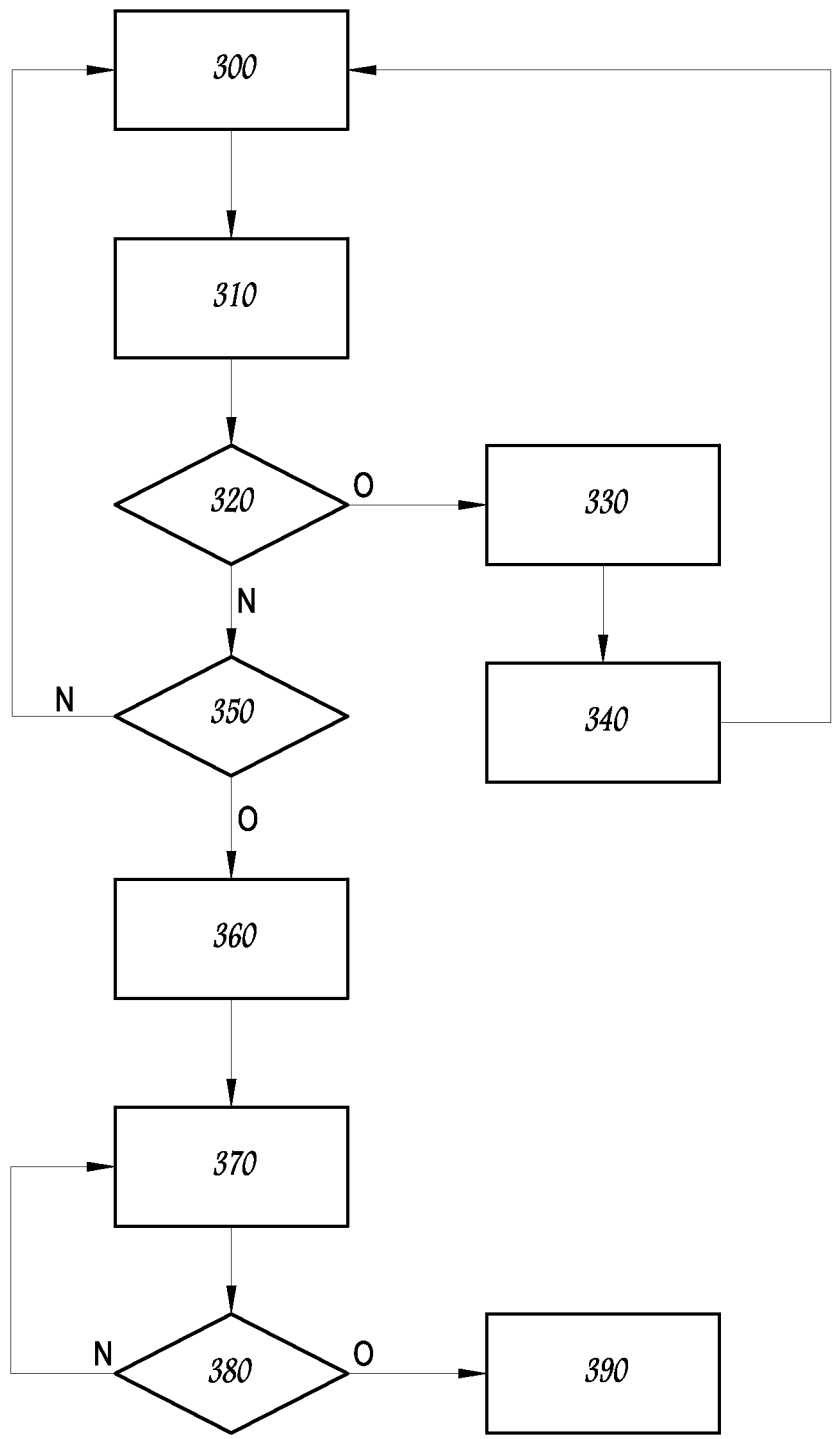
FIG. 3 is a flowchart of the main steps of a software program able to implement the invention.

The flowchart of FIG. 3 illustrates the main steps applied by the software control module 22 of a radio emission/reception sub-system 12 applying the invention.

A step 300 for awaiting a request from a software defined radio application is applied by the software control module 22.

During the reception of a request in step 310, it is checked that this is a primary control request RP in step 320. The distinction between primary and secondary control requests is accomplished, for example, according to the formulation of the request. Indeed, as explained above, a programming interface 24 is dedicated to primary requests, which are different from secondary requests, specified in the programming interface 30.

In the case of a positive answer, step 320 is followed by step 330 for making available the means or interface 28 for activating the parameters specified in the primary control request RP, with view to driving the radio processing chain 18 according to these parameters, at an instant which may be subsequent to the instant for executing step 330.

Next, in step 340, the time information on the use of the processing chain, extracted from the primary control request RP is stored in memory.

In an embodiment, the primary control request RP specifies an instant $t_s$ for beginning emission or reception of the primary burst and a primary burst duration, with which it is possible to infer the instant of the end of use of the radio processing chain 18. The instant for beginning and ending use of the radio processing chain are stored in memory.

In a first scenario, the instant $t_s$ of the beginning of emission or reception of the burst coincides with the beginning of the use of the radio processing chain 18. The calculation of an instant of the end of use of the radio processing chain 18, knowing the duration of a burst, is then inferred trivially.

In a second scenario, the radio processing chain 18 starts earlier than the specified instant $t_s$, in order to take into account latencies in the processing chain. The shift of the starting instant of the radio processing chain 18 is then taken into account in the calculation of the instant of the end of use of the radio processing chain 18.

Step 340 is followed by a return to step 300 for awaiting a new request.

In the case of a negative answer to the test 320, it is checked in step 350 whether this is a secondary request, therefore stepping from a software defying radio application recorded beforehand as a secondary software defined radio application. In the case of a negative response, the step 350 is followed by a return to step 300 for awaiting a new request.

In the case of a positive response to the test 350, the secondary request is stored in memory and put on wait in step 360.

Step 360 is followed by step 370 for determining a primary inactivity period of the radio processing chain 18, by using the pieces of information of the beginning and of the end of use stored beforehand.

In an embodiment step 370 and the following steps are applied by a second programming task ("thread"), different from the firsts programming task applying steps 300 to 350, so as not to interfere with the priority processing of primary requests. These programming tasks share a memory space in which the first programming task stores information on the use of the radio processing chain 18, and stacks the secondary control requests to be carried out, and if need be, the corresponding secondary data requests, and the second programming tasks reads information in this memory space.

Thus, if two periods of use by the primary application $(t_s, t_e)$ and $(t_s', t_e')$ have been stored in memory, the period comprised between $t_e$ and $t_s'$ is a primary inactivity period. Of course, the instant $t_e$ is located in the future relatively to the application instant (current instant $t_c$), so as to be able to provide a processing operation beginning from instant $t_e$. Preferably, the determined primary inactivity period is the period the closest in the future to the current instant.

It is then checked in step 380 whether the signal processing operation required by the secondary request may be achieved during the time period $P=[t_e, t_s']$, for example by checking whether the requested number of samples may be received or emitted in the time period P, knowing the number of samples which the radio processing chain 18 is capable of processing, in emission or in reception, per unit time.

In the case of a positive answer at the end of step 380, therefore if the secondary request may be met, a control for driving the processing chain, comprising the signal information of the secondary request and the time instance of the beginning and end of the determined primary inactivity period, is sent to step 390. The secondary request is then deleted from the stack of awaiting secondary requests.

Step 390 is followed by the step for waiting a new request 300 described earlier.

In the case of a negative answer, step 380 is followed by the waiting for a new determination of the primary inactivity period of the radio modules (step 370).

The invention was described above with a primary application and a secondary application.

Alternatively, the simultaneous implementation of several secondary applications is contemplated. Each secondary application registers at the radio emission/reception sub-system, so that the radio emission/reception sub-system recognizes the origin of each of the secondary requests and sends adequate answers to the secondary applications. When the radio emission/reception sub-system receives several secondary requests, a processing order is applied for answering these requests according to the primary inactivity periods of the processing chain in response to the primary requests, as explained above.

According to a first alternative, the processing order is simply the order of arrival of the secondary request, according to standard order first come, first served.

According to a second alternative, the software module further includes means or an evaluator for evaluating the time required for the processing chain for processing each of the secondary requests, and means or applier for applying a corresponding processing order for example the increasing order of times required for the processing.

Thus, the software defined radio emission/reception radio sub-system proposed is capable of operating according to the hierarchy of requests of any number of independent applications simultaneously using this radio emission/reception sub-system. The proposed software defined radio emission/reception sub-system is flexible, inexpensive and easy to maintain.

What is claimed is:

1. A software defined radio emission/reception radio sub-system being part of software defined radio equipment, comprising:
   a radio processing chain, achieving for emission, a transformation of a digitized signal stemming from a software defined radio application into an electromagnetic signal capable of being conveyed by radio media, and vice versa, for reception, the transformation of the electromagnetic signal stemming from the radio media into the digitized signal capable of being processed by a software defined application;
   a software control module capable of driving said radio processing chain while strictly observing primary control requests from the software defined radio application, also called a primary software defined application, the software defined radio emission/reception radio sub-system being capable of processing secondary requests from at least one other software defined radio application also called a secondary software defined radio application, independent of the primary software defined radio application;
   the software control module including:
   a receiver receiving at least one of the secondary control requests of the secondary software defined radio application,
   a determiner determining at least one primary inactivity period of said radio processing chain corresponding to non-use of said radio processing chain according to the primary control requests emitted by the primary software defined radio application, and
   an activator activating via an interface said radio processing chain so as to satisfy for a determined primary inactivity period the at least one secondary control request emitted by the secondary software defined radio application.

2. The software defined radio emission/reception radio sub-system as recited in claim 1, wherein the software control module is further capable of determining, for a given determined primary inactivity period whether the duration of the primary inactivity period is sufficient for completely satisfying a received secondary control request, and wherein the activator for activating said radio processing chain is only applied in the case of positive determination.

3. The software defined radio emission/reception radio sub-system as recited in claim 1, wherein at least one of the primary control requests includes at least one piece of signal information relating to the signal to be emitted or to be received and at least one piece of time information relating to a time instant of the beginning of emission or reception.

4. The software defined radio emission/reception radio sub-system as recited in claim 3, wherein said piece of signal information comprises frequency information on the signal to be emitted or to be received, and a piece of information on the number of digital samples of signal to be emitted or to be received.

5. The software defined radio emission/reception radio sub-system as recited in claim 1, wherein the secondary control request includes at least one piece of signal information relating to the signal to be emitted or to be received, but does not include any time information relating to the time instant of the beginning of emission or reception.

6. The software defined radio emission/reception radio sub-system as recited in claim 1, wherein the sub-system includes a storage for storing in memory a pending secondary control request.

7. The software defined radio emission/reception radio sub-system as recited in claim 1, wherein the sub-system includes a receiver and storage for receiving and storing in memory several secondary control requests each stemming from a different secondary software defined radio application, and in that the software control module includes a selector for selecting secondary control requests to be processed according to a predetermined order.

8. Software defined radio equipment comprising:
   a software defined radio emission/reception radio sub-system as recited in claim 1;
   a primary software defined radio application; and
   a secondary software defined radio application capable of interfacing with the radio emission/reception sub-system, the primary software defined radio application being a telecommunications application and in the secondary software defined radio application being a cognitive radio application.

* * * * *